(12) United States Patent
Tuller et al.

(10) Patent No.: US 7,727,650 B2
(45) Date of Patent: Jun. 1, 2010

(54) INTERCONNECTED, 3-DIMENSIONAL FUEL CELL DESIGN

(75) Inventors: Harry Tuller, Wellesley, MA (US); Kathy Sahner, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/130,390

(22) Filed: May 30, 2008

(65) Prior Publication Data
US 2009/0011316 A1    Jan. 8, 2009

Related U.S. Application Data

(60) Provisional application No. 60/942,258, filed on Jun. 6, 2007.

(51) Int. Cl.
*H01M 8/10* (2006.01)
(52) U.S. Cl. .................................................. 429/31
(58) Field of Classification Search .................... 429/31
See application file for complete search history.

(56) References Cited

U.S. PATENT DOCUMENTS 5,509,189 A * 4/1996 Tuller et al. ................ 29/623.1
6,296,962 B1 * 10/2001 Minh ........................... 429/38
7,189,471 B2 * 3/2007 Jankowksi et al. ............ 429/38
7,210,937 B1 * 5/2007 Raghu ......................... 434/283
2006/0172168 A1 * 8/2006 Wright et al. ................. 429/32
2007/0015037 A1 * 1/2007 Cao ............................. 429/38
2007/0298301 A1 * 12/2007 Nakanishi ..................... 429/31

OTHER PUBLICATIONS

Singhal, S.C., Solid oxide fuel cells for stationary, mobile, and military applications, 2002, Solid State ionics, 152-153, p. 405-410.*
Gratson et al, Direct-Write Assembly of Three-Dimensional Photonic Crystals: Conversion of Polymer Scaffolds to Silicon Hollow-Woodpile Structures, Advanced Materials, 2006, pp. 461-465, 18, Wiley-VCH Verlag GmbH & Co. KGaA, Weinheim, Germany.

* cited by examiner

*Primary Examiner*—Jerry Lorengo
*Assistant Examiner*—Jared Wood

(57) ABSTRACT

Fuel cell structure. A plurality of microtubes are electrically inter-connected. Each microtube includes an anode and a cathode layer separated by an electrolyte layer. The plurality of microtubes are arranged in at least two adjacent layers with microtubes in a first layer extending in a first direction and the microtubes in the second layer extending in a second direction, the first and second directions being non-parallel.

18 Claims, 5 Drawing Sheets

INTERCONNECTED, 3-DIMENSIONAL FUEL CELL DESIGN

This application claims priority to provisional application Ser. No. 60/942,258 filed Jun. 6, 2007, the contents of which are incorporated herein by reference in it's entirety.

BACKGROUND OF THE INVENTION

This invention relates to fuel cells and more particularly to an array of microtubes forming an interconnected, 3-dimensional network that can be prepared by a direct-ink-writing (DIW) process.

As a consequence of ever-increasing energy demand and decreasing resources of fossil fuels, research activities have been focusing on new energy sources for many years. In electrochemical fuel cells, the chemical energy of a redox reaction is converted directly to electrical power, thus yielding a higher efficiency than conventional combustion processes. In addition, they have received much attention due to their versatility and low emission levels, which makes them promising candidates for clean, flexible, and—at the same time—highly economical power supplies.

Different approaches, ranging from low temperature devices with proton conducting polymer membranes to molten carbonate fuel cells (MCFC) and solid oxide fuel cells (SOFC) operating at high temperatures, have been proposed and introduced in the market [Sin1]. Compared to other concepts, the latter offers several particular advantages. Using a solid instead of a liquid electrolyte eliminates problems such as corrosion or containment. In contrast to polymer membrane-based devices, solid oxide electrolytes are not prone to CO poisoning, and no water management is needed to ensure their functionality [Bar1]. At least at an intermediate stage, their multi-fuel capability is also of interest [Blu1]. Whereas low-T devices use pure hydrogen, SOFC can be operated with various hydrocarbons, e.g, methane, natural gas or even CO without an internal reformer. To date, Yttria-stabilized $ZrO_2$ (YSZ) is used as the solid electrolyte in SOFC. Ni-YSZ composite cermet (anode) and perovskite Sr-doped $LaMnO_3$ or $(La,Sr)(Co,Fe)O_3$ solid solutions (cathode) have been widely studied as standard electrodes for SOFC [Sin1], [Rot1]. The expressions in square brackets refer to the references included herewith. The contents of all of these references are incorporated herein by reference.

In spite of the numerous advantages of SOFCs, many challenges in device design remain, so that these systems are still far from replacing well-established energy sources. One major limitation is the need for high operating temperatures, due to the fact that dense electrolytes without pinholes have to be provided to separate the air and fuel chamber. To prepare reliable, dense membranes, a minimum electrolyte thickness is required. At the same time, however, the total internal resistance of the fuel cell device needs to be sufficiently small to ensure a high cell performance. Consequently, the specific conductivity of the solid electrolyte must exceed a specific threshold value. In the case of the traditional electrolyte material in SOFC, namely yttria stabilized zirconia (YSZ), this requirement leads to operating temperatures in the range of 9° C. to 1000° C. [Bra1]. This implies the need for expensive sealants and interconnects of single cells, both of which must withstand high temperatures, as well as requiring complex manufacturing methods [Las1]. Therefore, one major step towards promotion of SOFC power sources is cost reduction by achieving lower operating temperatures. For this purpose, novel electrolytes have been studied. As an alternative to YSZ, Gd-doped ceria (CGO) may be used at temperatures even below 600° C., while still presenting high ionic conductivity in combination with low electronic transfer numbers [Kha1], [Bra2]. In addition, alternative cell designs are of great interest.

Conventionally, fuel cells are designed in a two-chamber set-up with reduction of oxygen (cathode reaction, air side) and oxidation of fuel (anode reaction, fuel side) taking place in separated chambers on either side of the respective electrolyte. Up to now, two SOFC designs have been predominantly studied: tubular cell stacks (cf. FIG. 2a), which are of particular interest for stationary applications, and planar cells (cf. FIG. 2b), which are expected to serve in mobile applications due to their superior power density [Sin1] [Blu1]. Such a mobile system is of interest as an auxiliary power unit (APU) in automotive applications. In 2001, for example, BMW and Delphi introduced an APU based on SOFC technology for luxury cars.

With the tubular concept, which has been pursued for example by Siemens-Westinghouse for power generation systems [Sin1], high-temperature gas sealing is a minor issue. The single tubes, presenting an inner diameter of approximately 2 cm, a wall thickness of 2 mm, and an active length of up to 150 cm, are arranged in rows to create cell stacks. High-temperature stable interconnects assure electrical connectivity between the single cells as shown in FIG. 3.

Issues and limitations of the tubular device design include the following:
- tubular stacks present a low volumetric efficiency due to the low surface-to-volume ratio
- assembly of the cell stacks is difficult and thus leads to high cost
- high-temperature stable interconnects have to be provided
- they offer minimum potential for miniaturization or integration in MEMS devices An object of the present invention is a fuel cell design that overcomes the limitations of conventional tubular design, namely, its low volumetric efficiency, difficult assembly and high losses.

SUMMARY OF THE INVENTION

In one aspect, the fuel cell structure according to the invention includes a plurality of electrically interconnected microtubes, each microtube comprising an anode and a cathode layer separated by an electrolyte layer. The plurality of microtubes are arranged in at least two adjacent layers with the microtubes in a first layer extending in a first direction and the microtubes in a second layer extending in a second direction, the first and second directions being non-parallel. In a preferred embodiment, the first and second directions are substantially orthogonal to one another. It is also preferred that the individual fuel cells are solid oxide fuel cells. Suitable electrolytes are yttria stabilized zirconia (YSZ), gadolinia-doped ceria (GDC) and $(La,Sr)(Ga,Mg)O_3$ (LSGM). Suitable cathode layers include $(La,Sr)MnO_3$, $(La,Sr)(Co,Fe)O_3$ and $(Ba,Sr)(Co,Fe)O_3$. Suitable anode materials include the cermets Ni-YSZ and Ni-CGO.

A preferred inner diameter for the microtubes is in the range of 1 μm to 10 μm. A suitable cathode layer thickness is in the range of 500 nm to 5 μm. A suitable thickness for the electrolyte layer is in the range of 100 nm to 5 μm. It is preferred that the anode layer have a thickness in the range of 500 nm to 5 μm.

In one embodiment, the microtubes are connected electrically in parallel. In another embodiment, the microtubes are connected electrically in series.

It is preferred that the structures disclosed herein be made by a direct-ink-writing process. The structures disclosed herein also include manifolds for supplying air and fuel to the microtubes.

DESCRIPTION OF THE PREFERRED EMBODIMENT

Figure 1:
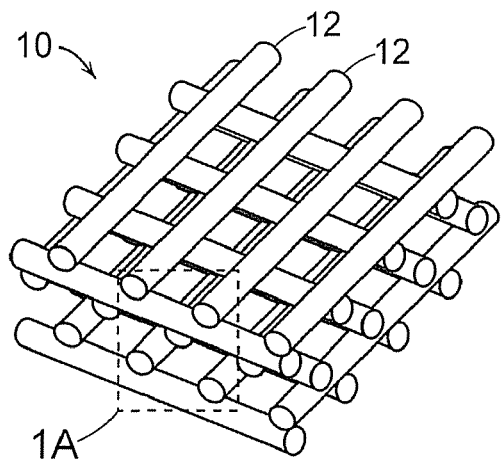
FIG. 1 is a perspective view, including an inset, of an embodiment of the 3-dimensional fuel cell design according to the invention.
Figure 1A:
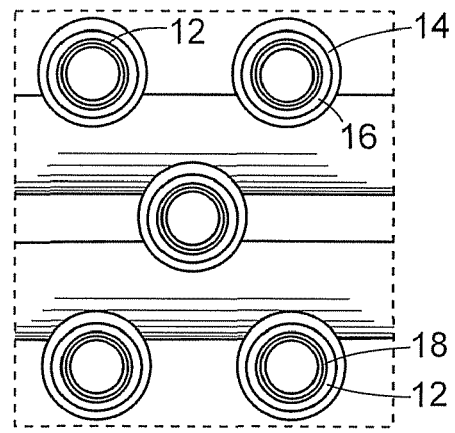

With reference first to FIG. 1, the novel fuel cell 10 disclosed herein includes an array of multiple microtubes 12 forming an interconnected, 3-dimensional network sometimes referred to herein as a "woodpile" structure. Each of the microtubes 12 includes an anode layer 14, an electrolyte layer 16 and a cathode layer 18. In this embodiment, air flows inside the microtubes 12 while fuel is supplied to the outer surfaces within the tube scaffold. Those of ordinary skill in the art will appreciate that the layer arrangement can be altered so that fuel flows inside the tubes and air is supplied to the outer surfaces.

Figure 4:
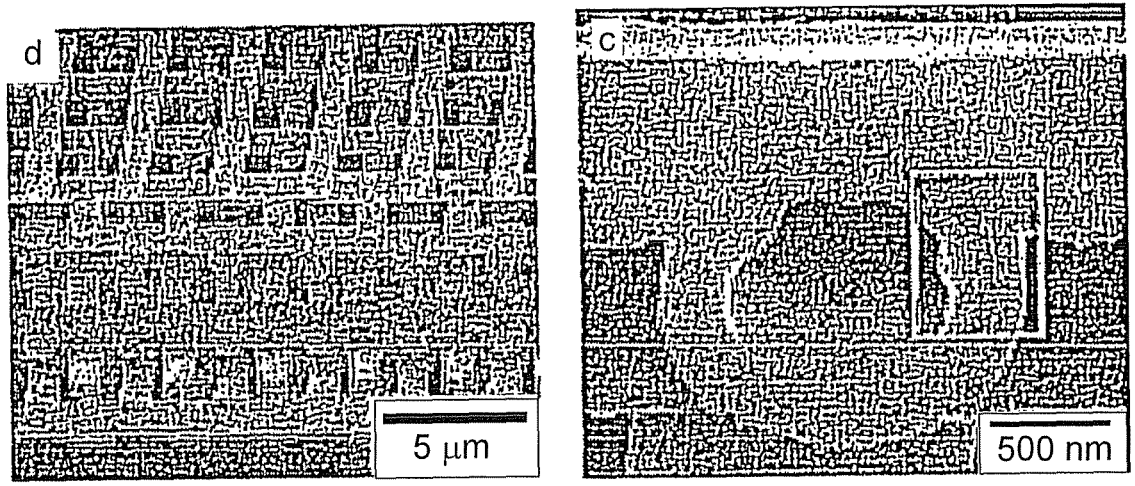
FIG. 4 includes micrographs of hollow woodpile structures using combined direct-ink-writing and chemical vapor deposition processes.

One approach to manufacture the design disclosed herein is the use of a combined Direct-Ink-Writing (DIW)-CVD process. This technology has been successfully employed to produce hollow woodpile photonic crystals (cf. FIG. 4, adapted from [Gra1], and [Gra2]).

Figure 5:
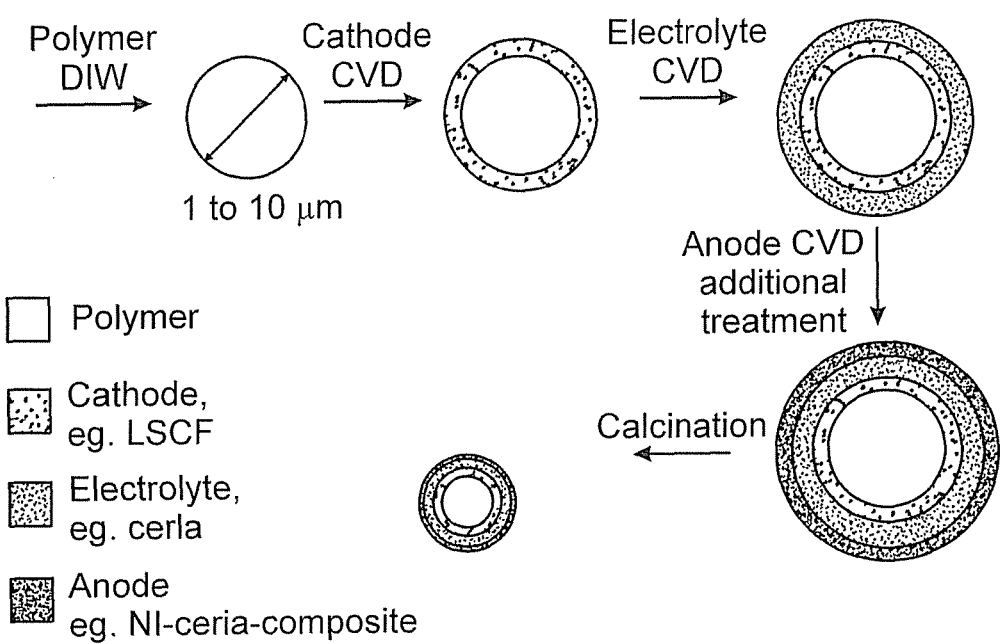
FIG. 5 is a diagrammatical representation of a manufacturing procedure to make the fuel cell structure of the invention.

The multi-tube SOFC device disclosed herein can be prepared, as an example, according to the scheme depicted in FIG. 5. For the sake of clarity, only one tube is presented in this diagrammatical representation. Either the inner or outer layer may be chosen as the cathode or anode i.e. the device can be designed to be cathode or anode supported.

In a first step, solid tubes of polymer precursor are deposited by DIW. This step determines the cross section of the miniaturized tubes and the piling of the rods, i.e., the degree of interconnectivity.

The mixed electronic-ionic conducting (MIEC) cathode material is deposited by CVD at low temperature. Possible candidates are $(La,Sr)(Co,Fe)O_3$ or $(Ba,Sr)(Co,Fe)O_3$. An interconnected cathode network is formed automatically. Optimum layer thickness (500 nm to some μm) is fixed by considerations with respect to mechanical sustainability and electrode resistance.

In a subsequent CVD (or electrochemical vapor deposition (EVD), see [Ped1] and references therein for details) step, the electrolyte material, either doped ceria or YSZ, is deposited. Considering ohmic losses, this layer should be as thin as possible, ideally between 100 nm and 5 μm. The electrochemical vapor deposition (EVD) process insures that a dense YSZ film forms even over a porous cathode or anode layer.

A cermet anode layer (e.g. Ni-YSZ, Ni-CGO) with a thickness of about 1 to 2 μm is also deposited by CVD. One commonly begins by depositing NiO-YSZ or NiO-CGO composites followed by a heat treatment in $H_2$ gas to reduce the NiO phase to Ni and thereby simultaneously to generate a percolating metallic phase and porosity. Further improvements in porosity of the anode structures to achieve optimum fuel penetration may benefit from additional treatments (thermal treatment, pre-treatment of the electrolyte surface) prior to or post deposition in order to achieve a high degree of porosity.

A calcination step (T≈475° C.) for template (polymer) removal and creation of a hollow tube is inserted between the CVD steps as appropriate depending on the temperatures needed for CVD. Alternatively, the different layers can be applied by other deposition techniques such as sol-gel based dip coating or electrophoretic deposition.

Figure 6A:
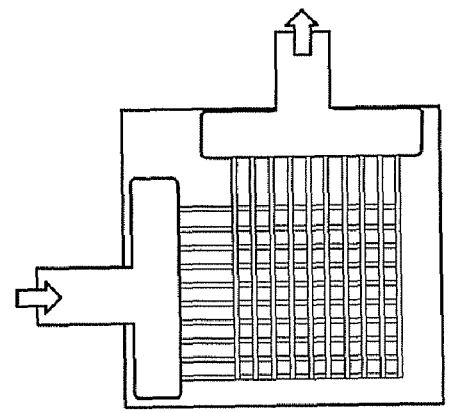
FIGS. 6a and 6b are diagrammatical representations of gas inlet and outlet manifolds for use in embodiments of the invention.
Figure 6B:
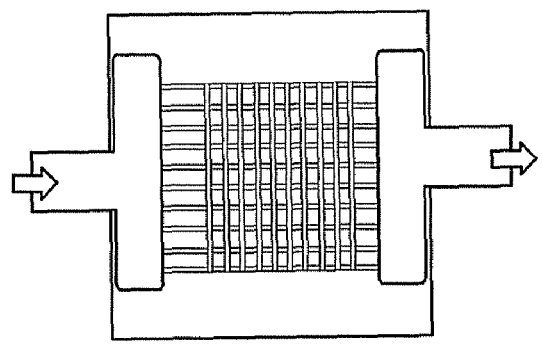

Gas supply of air and fuel to the respective electrodes can be achieved using manifolds similar to the ones used in sodium/sulfur batteries [Mik1] or in agrichemical systems [McC1]. In order to attach the manifold, the bottom row of microtubes needs to be extended to one side of the substrate as shown in FIG. 6. Gas tight sealing may be provided by glass seals which, given that they can be located at a much reduced temperature compared to the active part of the fuel cell, can be much more readily engineered than the high temperature seals required by the planar SOFC design.

All proposed layer thicknesses are feasible by CVD. As stated above, the deposition sequence might be switched to depositing the anode first and the cathode last. The maximum lateral dimensions of the DIW-process can presently exceed 1 cm×1 cm with rod diameters ranging from several hundreds of nm to several hundreds of μm [Gra1]. There appear to be no intrinsic features which, with further development, would limit the maximum lateral dimensions. The layers can either be closely packed, or the rods can form a scaffold-like structure as illustrated in the following.

Figure 7:
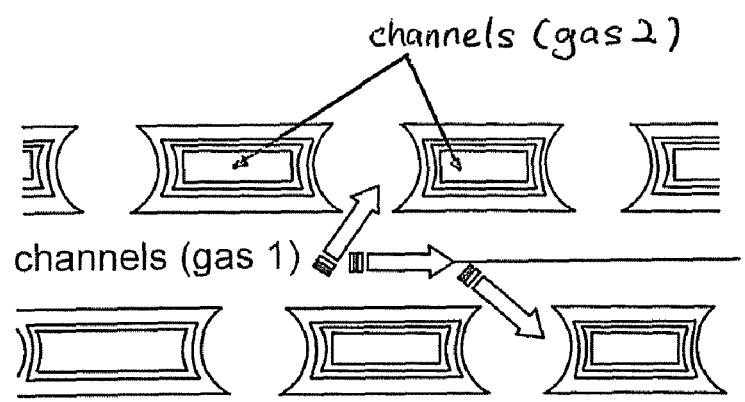
FIG. 7 is a cross-sectional view of a scaffold prepared according to an embodiment of the invention.

FIG. 7 shows a diagrammatical cross-section through the 3D fuel cell scaffold, indicating the interconnected channels for the feed gases 1 and 2. One gas flows inside the channel system formed by the hollow tubes (gas 1), whereas the other gas (gas 2) flows through the void space between the single tubes.

Figure 8:
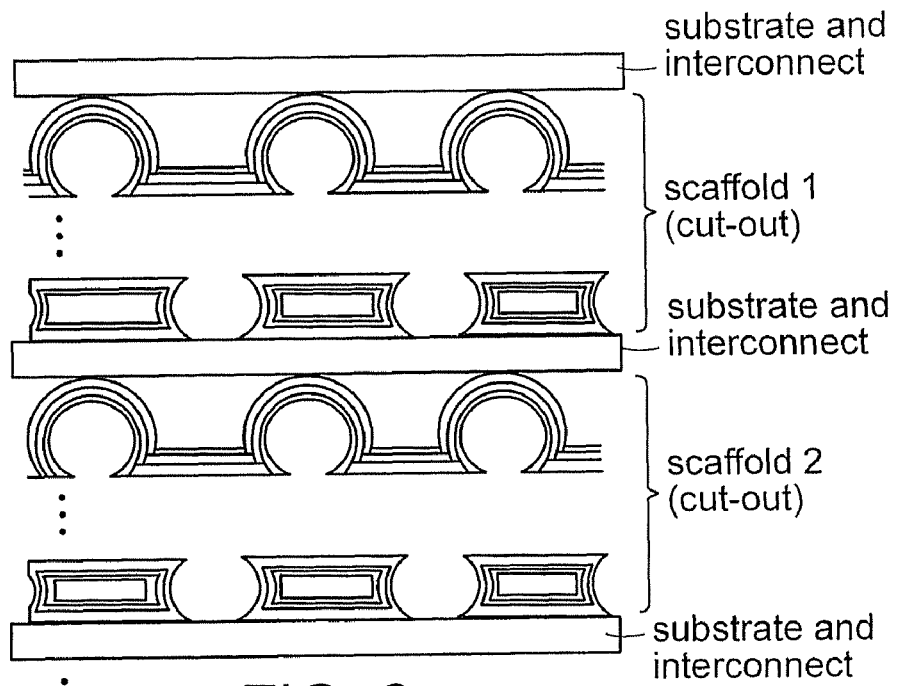
FIG. 8 is a cross-sectional view of two stacked scaffolds connected in series through a substrate/interconnect.

In contrast to the conventional tubular design, a three-dimensional cell stack is created in one single manufacturing step. The tubes are intrinsically electrically connected in parallel. A series connection of single SOFC scaffolds can be achieved in the following way. For this purpose, the planar substrates used for the DIW process are selected to be good electronic conductors in order to serve as the interconnect between adjacent cells. The substrate can be prepared from a typical interconnect material e.g. La-chromite based—$(La,Sr)CrO_3$ or for intermediate temperature operation, an oxidation resistant metal. By stacking DIW SOFC scaffold units (each unit can contain from a minimum of a single layer to multiple layers), one obtains the layer sequence depicted exemplarily in FIG. 8.

Figure 9:
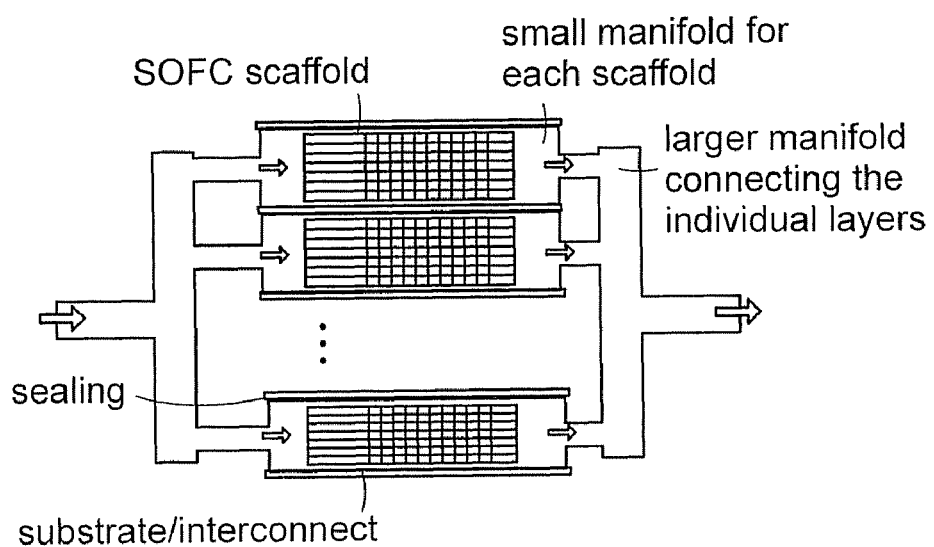
FIG. 9 is a schematic representation of a scaffold stack connected electrically in series and in parallel with respect to gas flow.

Thus, cathode and anode sides of the two cells are electrically connected (series cell connection). As an additional benefit, no further sealing is necessary in the stacked configuration, given that one gas is confined within the tubular channels by means of the manifold structure described above. The individual manifolds feeding each scaffold with one feed gas (air or fuel) can in turn be connected by a larger manifold as shown in FIG. 9. Since the tubular structures are gas-tight, the entire stack can then be exposed to the second feed gas.

It should further be noted that, in contrast to the Siemens Westinghouse tubular design, no complex interconnect design is required for stacking cells in the present invention.

Due to the small tube dimensions that can be achieved by DIW-CVD, the surface-to-volume ratio of the cell stack is enhanced. The following calculations estimate this gain in active surface area.

Figure 2A:
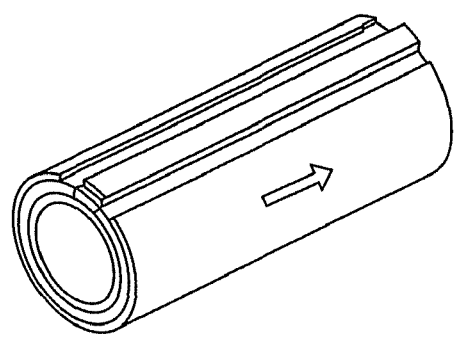
FIG. 2a is a perspective view of a prior art tubular SOFC fuel cell.
Figure 2B:
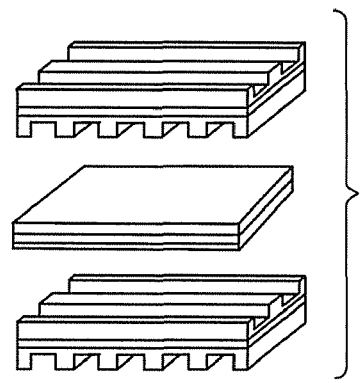
FIG. 2b is perspective schematic view of a prior art planar SOFC fuel cell.
Figure 3:
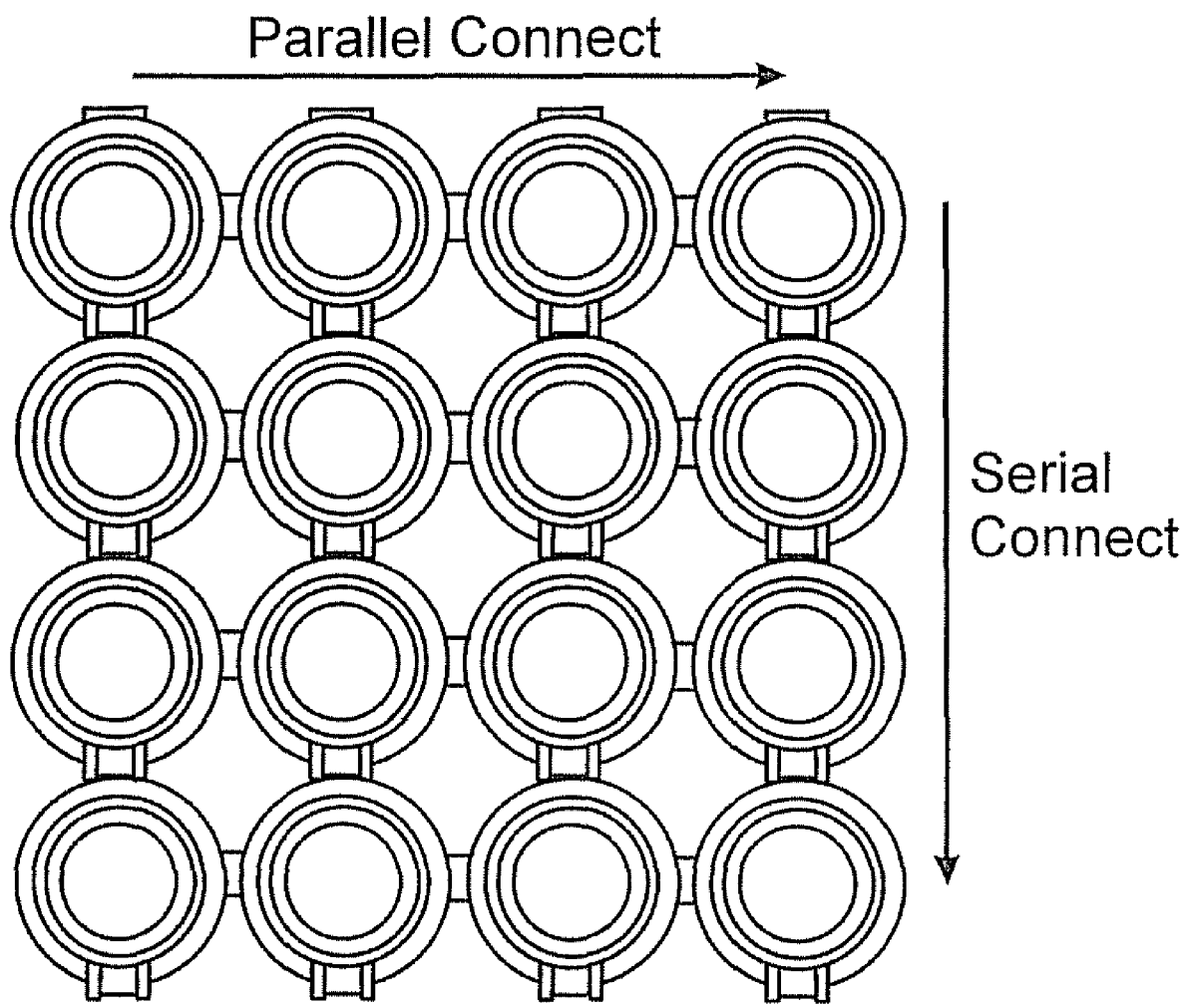
FIG. 3 is a cross-sectional schematic representation of a prior art tubular SOFC stack.

Consider a conventional SOFC tube as depicted in FIG. 2a. The conventional dimensions used for the Siemens-Westinghouse tubes according to [Www1] are summarized in Table 1.

With the DIW-technique, cell dimensions as low as 1 µm (inner diameter) are feasible. Two possible dimensions for the woodpile stacks are included in Table 1. Design (A) describes a very compact design with 1 cm tube length (cf. presently feasible dimensions stated above), an inner tube diameter of 5 µm and a wall thickness (comprising electrodes and electrolyte) of 5 µm. For design (B), the inner diameter is quadrupled and the wall thickness is doubled.

TABLE 1

Comparison between conventional and the proposed novel design illustrating the dramatic increase in active surface area.

| Dimensions | tubular SOFC (Siemens-Wesinghouse), [Www1] | Novel design A | Novel design B |
|---|---|---|---|
| Inner diameter/cm | 1.18 | 0.0005 | 0.002 |
| Outer diameter/cm | 1.59 | 0.001 | 0.003 |
| Active length/cm | 50 | 50 | 50 |
| (Total) geometric surface area, cathode/cm$^2$ | 185 | 99300 | 44100 |
| (Total) geometric surface area, anode/cm$^2$ | 250 | 198600 | 66200 |

Using the dimensions included in Table 1, one tube in the Siemens-Westinghouse-SOFC fills a total volume of $\pi \cdot (1.59 \text{ cm}/2)^2 \cdot 50 \text{ cm} = 99.3 \text{ cm}^3$. The cathode presents a geometric surface area of $2 \cdot \pi \cdot (1.18 \text{ cm}/2) \cdot 50 \text{ cm} = 185 \text{ cm}^2$, the anode surface area equals $2 \cdot \pi \cdot (1.59 \text{ cm}/2) \cdot 50 \text{ cm} = 250 \text{ cm}^2$.

Assuming that the complete volume of such a tube is filled with piled multi-walled microtubes and assuming further that the piling of the single rods would lead to a maximum filling degree of 50%, one would need approximately $1.4 \cdot 10^5$ tubes in the case of design A and $1.3 \cdot 10^6$ tubes for design B. The total available surface area for the cathode thus amounts to 99300 cm$^2$ (design A) and 44100 cm$^2$ (design B). For the anode, calculations yield for design A and B 198600 cm$^2$ and 66200 cm$^2$, respectively. The available surface without increasing the volume of the device would thus increase considerably (factors between 260 and 800).

The proposed device can be further downscaled and thus be customized for specific applications, e.g. as an alternative to conventional batteries. In addition, the integration of MEMS and DIW has been demonstrated and offers opportunities to integrate the novel cell concept with conventional platforms.

The unique versatility of the DIW process, which allows one to precisely control cross-section, dimensions, and piling, may be used to carefully optimize the three-dimensional cell stack to achieve best cell performance. The process can be adapted easily to alternative electrode or electrolyte materials.

A very thin electrolyte thickness (100 nm to 5 µm) compared to thicknesses >10 µm used in conventional tubular designs [Sin1] can be prepared, thereby reducing ohmic losses of the cell.

Making use of the novel processing technique disclosed herein, the novel tubular design thus presents an attractive alternative to the conventional set-up with high potential for further optimization.

It is recognized that modifications and variations will be apparent to those of ordinary skill in the art and it is intended that all such modifications and variations be included within the scope of the appended claims.

REFERENCES

[Bar1] Baron, S., *Intermediate temperature (500-850° C.) solid oxidefuel cells (IT-SOFCs) explained*, Fuel Cell Today (2005), 1-12.

[Blu1] Blum, L., Meulenberg, W. A.; Nabielek, H., Steinberger-Wilckens, R., *Worldwide SOFC technology overview and benchmark*, in: Proceedings of the 29th International Conference on Advanced Ceramics and Composites, Cocoa Beach, Fla., USA, Jan. 23-28, 2005, 3-14.

[Bra1] Brandon, N. P., Skinner, S., Steele, B. C. H., *Recent advances in materials for fuel cells*, Annu. Rev. Mater. Res. 33 (2003), 183-213.

[Bra2] Brandon, N. P., Corcoran, D., Cummins, D., Duckett, A., El-Khoury, K., Haigh, D., Leah, R., Lewis, G., Maynard, N., McColm, T., Trezona, R., *Development of metal supported solid oxide fuel cells for operation at 500-600° C.*, Journal of Materials Engineering and Performance, 13 (2004), 253-256.

[Gra1] Gratson, G. M., Garcia-Santramaria, F., Lousse, V., Xu, M., Fan, S., Lewis, J. A., Braun, P. V., *Direct-write assembly of three-dimensional photonic crystals: conversion of polymer scaffolds to silicon hollow-woodpile structures*, Adv. Mater. 18 (2006), 461-465.

[Gra2] Gratson, G. M., Lewis, J. A., Directed assembly of three-dimensional structures with micron-scale features, U.S. Pat. No. 7,141,617 (2006)

[Kha1] Kharton, V. V., Figueiredo, F. M., Navarro, L., Naumovich, E. N., Kovalevsky, A. V., Yaremchenko, A. A., Viskup, A. P., Carneiro, A. M. F. M. B., Frade, J., *Ceria-based materials for solid oxide fuel cells*, J. Mater. Sci., 36 (2001), 1105-1117.

[Las1] Lashtabeg, A., Skinner, S. J., *Solid-oxide fuel cells—a challenge for materials chemists*. J. Mater. Chem. 16 (2006), 3161-3170.

[McC1] McCracken, A., et al. *Microtube applicator system*, U.S. Pat. No. 4,697,739 (1987).

[Mik1] Mikkor, M., *Volume efficient sodium sulfur battery*, U.S. Pat. No. 4,226,923 (1980).

[Ped1] Pederson, L. R. Singh, P, Zhou, X. D., *Application of vacuum deposition methods to solid oxide fuel cells*, Vacuum 80 (2006) 1066-1083

[Rot1] Rotureau, D., Viricelle, J., Pijolat, C., Caillol, N., Pijolat, M., *Development of a planar SOFC device using screen-printing technology*, J. Eur. Ceram. Soc., 25 (2005), 2633-2636.

[Sha1] Shao, Z.; Haile, S. M., Ahn, J.; Ronney, P. D.; Zhan, Z.; Barrett, S. *A thermally self-sustained micro solid-oxide fuel-cell stack with high power density*, Nature, 435 (2005), 795-798.

[Sin1] Singhal, S., *Solid oxide fuel cells for stationary, mobile, and military applications*, Solid State Ionics, 152-153 (2002), 405-410.

[Www1] http://www.nfcrc.uci.edu/ACTIVITIES/projects/westinghouse.htm

What is claimed is:

1. Fuel cell structure comprising:
a plurality of electrically connected microtubes, each microtube comprising an anode and a cathode layer separated by an electrolyte layer wherein each microtube further comprises an interior gas channel, the plurality of microtubes arranged in at least two adjacent layers with the microtubes in a first layer extending in a first direction and the microtubes in a second layer extending in a second direction, the first and second directions being non-parallel wherein a junction is formed at each contact point between the microtubes and the interior gas channels of the microtubes are interconnected at each junction.

2. The structure of claim 1 wherein the first and second directions are substantially orthogonal to one another.

3. The structure of claim 1 wherein the microtubes form solid oxide fuel cells.

4. The structure of claim 1 wherein the electrolyte layer is yttria stabilized zirconia, YSZ.

5. The structure of claim 1 wherein the electrolyte is gadolinia-doped ceria, GDC or $(La,Sr)(Ga,Mg)O_3$ (LSGM).

6. The structure of claim 1 wherein the cathode layer comprises $(La,Sr)MnO_3$, $(La,Sr)(Co,Fe)O_3$ or $(Ba,Sr)(Co,Fe)O_3$.

7. The structure of claim 1 wherein the anode is a cermet Ni-YSZ or Ni-CGO.

8. The structure of claim 1 wherein the microtube inner diameter is in the range of 1 μm to 10 μm.

9. The structure of claim 1 wherein the cathode layer has a thickness in the range of 500 nm to 5 μm.

10. The structure of claim 1 wherein the electrolyte layer has a thickness in the range of 100 nm and 5 μm.

11. The structure of claim 1 wherein the anode layer has a thickness in the range of 500 nm to 5 μm.

12. The structure of claim 1 wherein the tubes are connected electrically in parallel.

13. The structure of claim 1 wherein the tubes are connected electrically in series.

14. The structure of claim 1 made by direct-ink-writing.

15. The structure of claim 1 further including manifolds for supplying air and fuel to the fuel cell array.

16. The structure of claim 1 made by a combination of direct-ink-writing and chemical vapor deposition.

17. The structure of claim 1 wherein the cathode, anode and electrolyte layers are applied using chemical vapor deposition (CVD), dip coating or electrophoretic deposition.

18. The structure of claim 1 wherein the electrolyte layers are applied using electrochemical vapor deposition (EVD).

* * * * *